Nov. 10, 1959 — E. C. McRAE — 2,911,962

ENGINE ACCESSORY DRIVE

Original Filed Oct. 8, 1956 — 3 Sheets-Sheet 1

E. C. McRAE
INVENTOR.

BY J. R. Faulkner
Q. H. Oster

ATTORNEYS

Nov. 10, 1959   E. C. McRAE   2,911,962
ENGINE ACCESSORY DRIVE

Original Filed Oct. 8, 1956   3 Sheets-Sheet 2

E.C. McRAE
INVENTOR.
BY J. R. Faulkner
D. H. Oster

ATTORNEYS

| | HORSE POWER REQUIRED | | |
|---|---|---|---|
| | 40 MPH DIRECT | 80 MPH DIRECT | 80 MPH LOW SPEED |
| 5 BLADE FAN | 1.0 | 6.0 | 2.0 |
| POWER STEERING PUMP (FREE) | .4 | 1.2 | .7 |
| 50 AMP GENERATOR | 1.4 | 2.2 | 1.6 |
| WATER PUMP | .5 | 2.6 | 1.4 |
| TOTAL | 3.3 | 12.0 | 5.7 |

United States Patent Office 2,911,962
Patented Nov. 10, 1959

2,911,962
ENGINE ACCESSORY DRIVE

Edwin C. McRae, Dearborn, Mich., assignor to Ford Motor Company, Dearborn, Mich., a corporation of Delaware Continuation of abandoned application Serial No. 614,446, October 8, 1956. This application August 18, 1958, Serial No. 756,063

25 Claims. (Cl. 123—41.11)

This is a continuation of my application Serial Number 614,446, filed October 8, 1956, now abandoned.

This invention relates to means for driving the accessories commonly associated with internal combustion engines and is particularly adapted to present day high speed automobile engines. The modern automobile engine is designed to idle at about 400 r.p.m. and has a top speed of about 4500 r.p.m. Such engines are commonly provided with a cooling fan, water pump, generator and power steering pump and often with an air conditioner compressor. These units are usually driven by V-belts from the engine crankshaft and often three or four different belts are required to drive these various accessories.

It is well known that the minimum size of the cooling fan is controlled by the engine cooling requirements at idle engine speed. When a fan of sufficient size is provided to cool the engine at idle speed, the capacity of such a fan is excessive for increased engine speeds. It is also well known that the power required to drive any fan is increased by the cube of the fan speed. Consequently, appreciable power savings can be made if the ratio of the fan speed to the engine speed can be reduced at high engine r.p.m. A further advantage of reducing the ratio of a fan to engine speed is that the noise unavoidably generated by such fans is appreciably reduced at lower speeds.

These same observations apply to some extent to the generator, the speed of which at idling must be sufficient to operate the ignition system and parking lights. A speed ratio that will meet these requirements is such that generator speeds of 12 to 15,000 r.p.m. are required at top engine speed, whereas ample current can be generated at much lower generator speeds. Appreciable savings in the cost of manufacturing such generators can be made if their top speed can be limited below 10,000 r.p.m. Above 10,000 r.p.m. expensive constructions must be employed to protect the armature windings against the centrifugal force generated.

The maximum output requirements for the power steering pump also occur at low engine speeds. Increasing the speed of such pump in direct proportion to the engine speed only consumes extra power with no increase in performance and function of the unit.

The object of this invention is therefore to provide an accessory drive which will drive the various accessories at a fixed ratio to the engine for engine speeds up to about 1600 r.p.m. and which for engine speeds above 1600 r.p.m. will drive such accessories at a fixed reduced speed ratio.

A further object of this invention is to provide a unique belt drive arrangement which will provide two speed ratios and which will drive the four standard engine accessories with only two driving belts.

Still a further object of this invention is to provide a speed ratio changing device which is actuated by oil pressure used in lubricating the engine and in which the oil pressure is controlled by an engine operated centrifugal governor.

The need for a two speed accessory drive has been well known for some time but all devices for this purpose known to the applicant have been lacking in some major respect. Slipping clutches have been proposed but the heat generated is excessive. When two distinct speed ratios have been provided, the power required to shift the ratios has been such that a speed responsive governor is not satisfactory. Torque responsive mechanisms give sufficient power but the torque requirements of the accessories vary over such a wide range that the shift is not a function of engine speed. A relatively narrow speed range where the shifts occur is almost a necessity and this is believed to be first accomplished with the device shown herein.

With these and other objects in view, my invention consists of the arrangement, construction, combination and various parts comprising this invention as shown in the accompanying drawings, in which.

Figure 1:
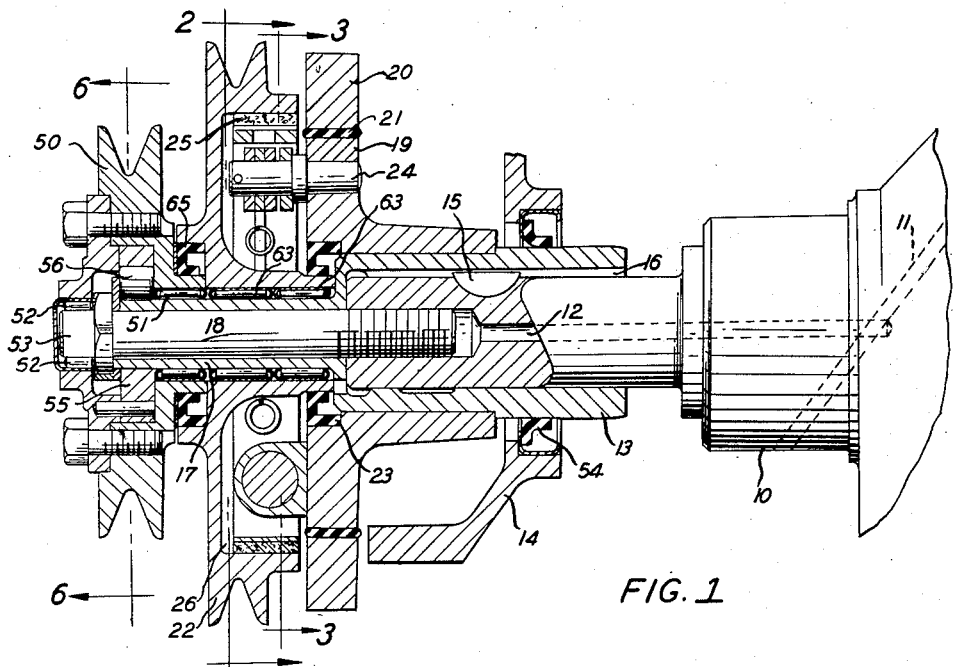
Figure 1 is a vertical central, sectional view through the front end of an engine crankshaft having my improved accessory drive speed changing unit mounted thereon.
Figure 2:
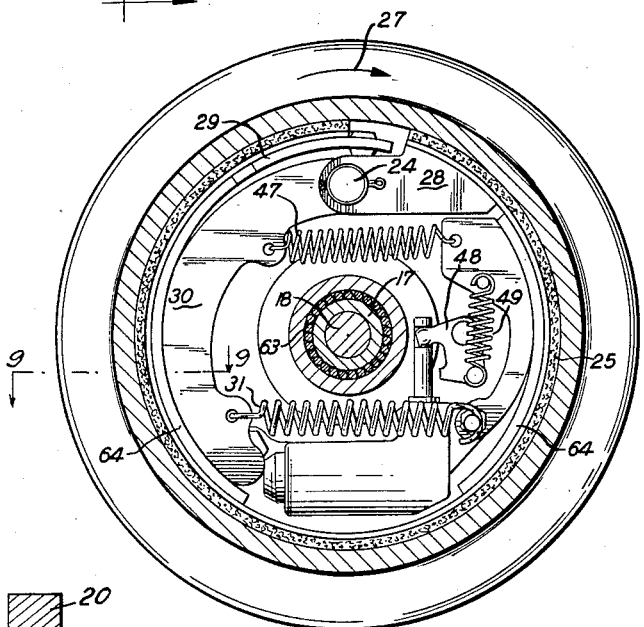
Figure 2 is a sectional view, taken on the line 2—2 of Figure 1.

Referring to Figure 1 of the accompanying drawings it will be noted that I have used the reference numeral 10 to indicate a conventional automobile engine crankshaft. Such shafts are ordinarily provided with drilled passageways therethrough wherein oil is conducted under pressure to each of the main and crankpin bearings. One of such passageways is shown by dotted lines 11. The crankshaft used with my improved drive is modified to the extent that a second drilled passageway 12 extends from the front end of the crankshaft axially therethrough and intersects the passageway 11. Thus when the engine is being operated, oil under pressure will be conducted to the passageway 12.

A driving sleeve 13 is keyed to the front end of the crankshaft 10 by means of a key 15 in the crankshaft and a keyway 16 in the sleeve. The sleeve projects through the front face of the engine crankcase, a portion of which is identified by numeral 14. An oil seal 54 is ordinarily provided between the sleeve 13 and the face 14. A sleeve 17 of reduced cross section is formed integrally with the sleeve 13 and extends forwardly from the engine crankshaft. A bolt 18 extends axially through the sleeve 17 and is threaded into the crankshaft to rigidly secure the sleeves to the crankshaft.

A driving plate 19 is rigidly secured to the sleeve 13 and has a torsional vibration dampening ring 20 resiliently bonded thereto by elastic material 21. This vibration member forms no part of this invention but is shown herein to illustrate how this invention can be adapted to the modern automobile engine.

Figure 9:
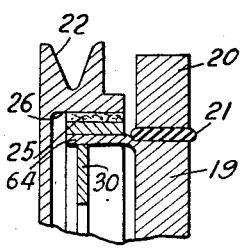
Figure 9 is a sectional view taken on the line 9—9 of Figure 2, and showing the pulley in full section.

A first speed driving pulley 22 is rotatably mounted on the sleeve 17 adjacent to the driving plate 19 by means of needle bearing assemblies 63 and an oil seal 23 is interposed between the hub of the pulley 22 and the hub of the driving plate. A driving stud 24 is fixed to the plate 19 near its outer rim and serves as an anchor for a clutch band which operatively connects the driving plate to the pulley 22. The clutch band has been given numeral 25 and comprises a conventional steel backing member upon which anti-friction lining is riveted or bonded. The clutch band, in its engaged position, is adapted to expand into engagement with a cylindrical clutch face 26 in the pulley 22 to form a conventional internal expanding friction clutch. Referring now to Figure 9 it can be seen that cylindrical backing members 64 are formed integrally with the plate 19 and position the band 25 concentric with the sleeve 17 when the band is inoperative. The driving plate and crankshaft rotate in the direction of arrow 27 and the band 25 is anchored so as to be fully energized. The anchored end of the band 25 is secured to a clevis member 28 which is anchored on the stud 24 while the free end of the band 25 is secured to a reinforcing plate 29 which operatively is moved circumferentially to engage and disengage the band from its clutch face. An ordinary bellcrank lever 30 is pivotally mounted on the stud 24 between the arms of the clevis 28. As can most readily be seen by reference to Figure 3, one end of the lever 30 designated by the numeral 70 engages in a slot 71 in the plate 29 so that movement of the lever 30 around the pin 24 moves the free end of the clutch band 25 circumferentially so that the band is moved into and out of engagement with the clutch face 26 on the pulley 22.

A relatively heavy spring 31 is arranged to urge the lever 30 at all times to the position where the clutch band 25 engages the clutch face on the pulley 22. From the description of the parts so far identified it will be seen that when the engine crankshaft is rotated in the direction of arrow 27 the driving stud 24 will rotate the clutch band 25 in the same direction and that the spring 31 will urge the lever 30 to the position where the band 25 will be forced outwardly to engage the clutch face 26 on the pulley 22. The pulley 22 will thus be driven in synchronism with the engine crankshaft at all times while this clutch is engaged.

Figure 3:
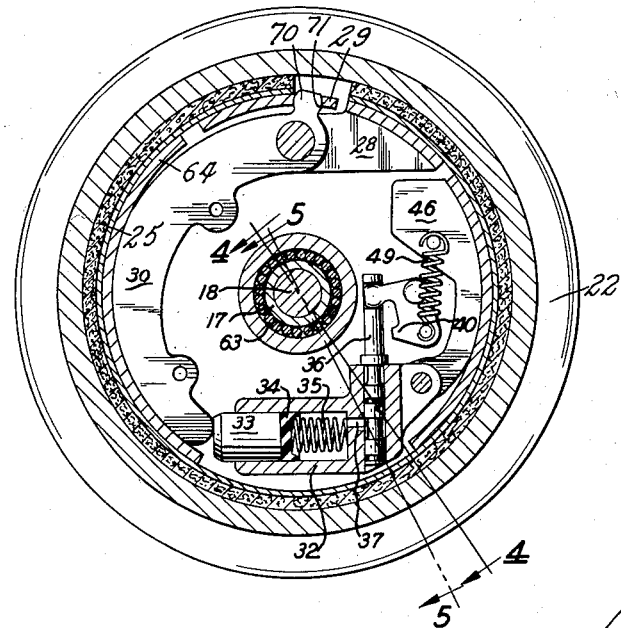
Figure 3 is a sectional view, taken on the line 3—3 of Figure 1.

Referring to Figure 3, I have shown means whereby the force exerted by the spring 31 can be counteracted to thereby disengage the clutch band from the clutch face. To accomplish this I have provided a cylinder housing 32 which is fixed to the plate 19 in position diametrically opposed to the stud 24. The housing 32 is provided with a piston 33 reciprocally mounted therein and a sealing cup 34 abuts the inner end of the piston and is resiliently held in place by a spring 35. When oil under pressure is introduced in the housing the piston 33 is urged outwardly and bears against the free end of the lever 30 to move it clockwise around the stud 24 against the force applied by the spring 31.

Since the cylindrical backing members 64 are formed integrally with the plate 19, it is apparent that the outward movement of the piston 33 and the lever 30 is limited by one of the members 64 and that the outward movement of piston 33 cannot force this member 64 outwardly against the band 25 to cause engagement of the band with clutch face 26.

As has been mentioned earlier, the oil pressure ordinarily used to lubricate the engine crankshaft is utilized to actuate the piston 33. To accomplish this a spool type valve 36 is reciprocally mounted in a suitable bore in the housing 32. The housing 32 is provided with a passageway 37 which connects the valve bore with the cylinder bore and is also provided with an oil intake passageway 38 which connects the valve bore with an oil pressure line from the engine. An exhaust passageway 39 is also provided in the housing 32 which is provided to conduct the oil from the cylinder 32 back to the engine crankcase. There is nothing novel in the sleeve valve 36, it being sufficient to specify that when the valve is in the position shown in the drawings, oil will be conducted from the intake passageway 38 around the reduced portion of the valve 36 to the passageway 37 and into the cylinder housing. When the valve 36 is moved upwardly from the position shown the intake passageway 38 will be obstructed by the valve while the passageway 37 will be connected to the exhaust passageway 39 to thereby permit oil which may be trapped in the housing to exhaust and permit the piston 33 to move back in its cylinder.

Figure 4:
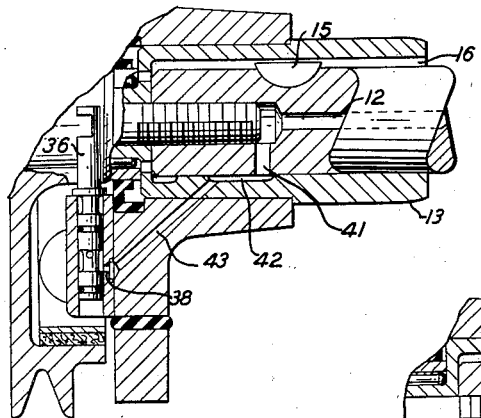
Figure 4 is a sectional view, taken on the line 4—4 of Figure 3.
Figure 6:
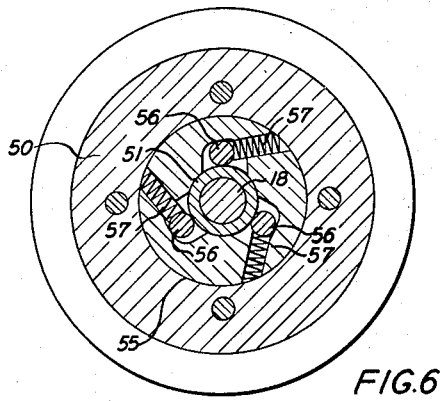
Figure 6 is a sectional view, taken on the line 6—6 of Figure 1.
Figure 5:
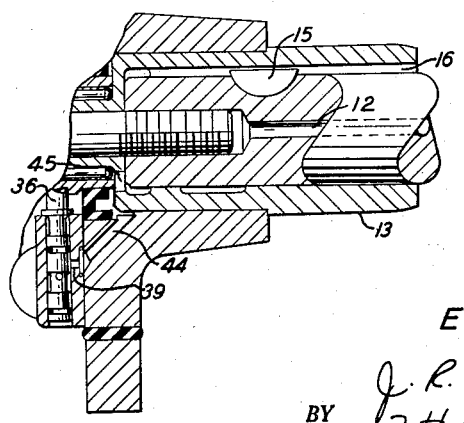
Figure 5 is a sectional view, taken on the line 5—5 of Figure 3.

Referring to Figure 4, the crankshaft 10 is provided with a radial passageway 41 which is aligned with an elongated groove 42 in the sleeve 13. A drilled opening 43 extends through the plate 19 and connects the groove 42 with the intake passageway 38. Referring to Figure 5, an exhaust opening 44 is drilled through the plate 19 to connect the exhaust passageway 39 with the space formed around the forward end of the sleeve 13. Oil exhausted through the passageway 44 flows downwardly around the oil seal 23 to lubricate the bearings 63. An opening 45 is provided in the forward end of the sleeve 13 which conducts the exhaust oil to the keyway 16 where it flows rearwardly and is discharged into the engine crankcase interiorly of the oil seal 15.

From the foregoing it will be seen that when the valve 36 is in the position shown in the drawings, oil under pressure from the engine oiling system will be conducted to the housing 32 to move the piston 33 outwardly. This movement of the piston will counteract the force of the spring 31 and, by means of the bellcrank lever 30, will move the clutch band 25 out of engagement with the clutch face on the pulley 22. When the valve 36 is moved upwardly the oil from the engine will be blocked by the valve and the oil which is in the housing 32 will be conducted through the passageway 44 and keyway 16 back to the engine crankcase. This will permit the spring 31 to move the lever 30 counterclockwise to thereby re-engage the band 25 with the pulley 22 and thus cause the pulley to be driven by the driving plate 19.

I have provided a snap-over type of actuating mechanism for operating the valve 36 by a centrifugal governor driven by the engine. A centrifugal weight 46 is pivotally mounted on the plate 19 by one of the bolts which holds the housing 32 in place and a spring 47 resiliently urges the weight inwardly. When the plate 19 is rotating at about 1600 r.p.m. sufficient centrifugal force is generated in the weight 46 to overcome the force of the spring 47 so that at such speed the weight will start to move outwardly. An increase in engine speed will cause the weight 46 to complete its outward movement in a manner common to centrifugal governors. A snap-over link 48 is pivotally mounted on the plate 19 and has one end which engages a slot in the upper end of the valve 36. Oscillation of the link 48 thereby reciprocates the valve 36 through its normal movement. An over-center spring 49 extends between the link 48 and the weight 46 so that when the weight 46 is moved to the position shown in the drawing this spring 49 will snap the link 48 counterclockwise to move the valve 36 to the position shown in the drawings. Conversely, when the weight 46 moves inwardly the spring 49 will pass over the center of the link 48 to snap it clockwise to its other position. The purpose of this snap-over mechanism is to prevent the valve 36 from assuming a locked-up position where the oil pressure is partially applied but not sufficiently to positively disengage the clutch band. This is commonly known in hydraulic systems as means for preventing the valve from hanging up. A stop 49 is provided on the link 48 which bears against the valve 36 when in its last mentioned position. This stop limits the outer movement of the valve 36.

It will be noted that one end of the spring 47 is fastened to the weight 46 and that the other end is fastened to the lever 30 at a point spaced from its pivot 24. As a result, after the weight 46 moves to its outer position and lever 30 is moved outwardly by the piston 33, the spring 47 is further tensioned. This further tensioning of the spring 47 causes the weight 46 to move inwardly at smaller reduction in engine speed than would occur if the spring 47 were anchored to the plate 19. Thus the speed range to cover the outward and inward movement of the weight 46 is much smaller than in a conventional governor.

Referring again to Figure 1, I have provided a second speed driving pulley 50 which is also rotatably mounted upon the sleeve 17 by means of a needle bearing assembly 51. A second needle bearing assembly 52 rotatably supports the outer edge of the pulley 50 upon an extension 53 on the bolt 18. An overrunning clutch assembly is housed within a suitable bore in the pulley 50, such assembly consisting of an outer cam ring 55 having a plurality of clutch rollers 56 which are resiliently urged therein by means of springs 57 to form a conventional roller type overrunning clutch. A shoe type overrunning clutch or a sprag type clutch may be used equally as well as the type shown. The cam ring 55 is designed so that the pulley 50 can freely rotate clockwise relative to the sleeve 17 while the rollers 56 prevent counterclockwise relative rotation between the sleeve and the pulley. A conventional oil seal 65 is mounted between the pulley 22 and the pulley 50 which prevents oil which has been fed in around the needle bearings from being thrown out of the unit.

Figures 7, 8:
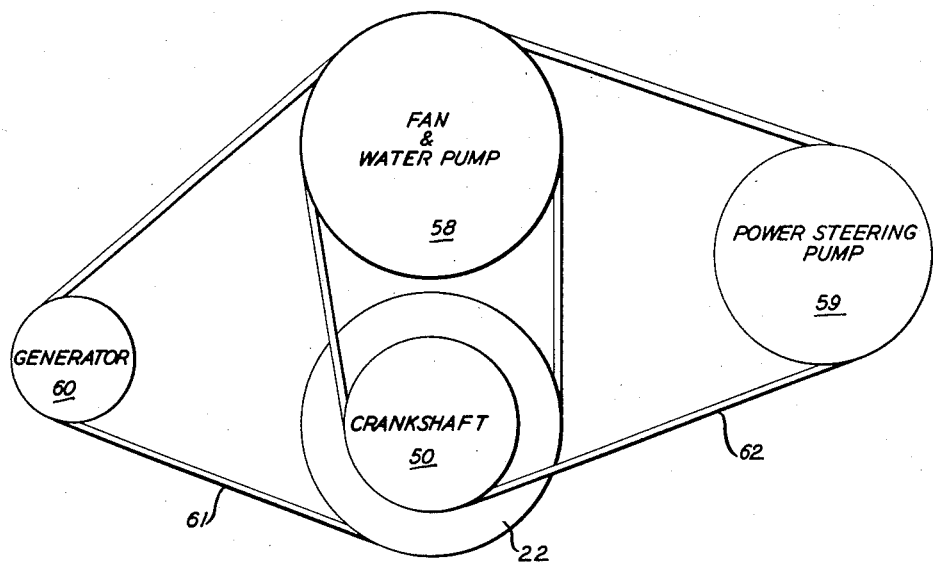
Figure 7 is a schematic view of the belt and pulley arrangement used in this drive.
Figure 8 is a chart showing the typical horsepower requirements required to drive the four standard automobile engine accessories.

Referring to Figure 7, I have shown the pulleys 22 and 50 in position mounted upon the crankshaft while a double-grooved fan and water pump pulley 58 is rotatably mounted directly above the crankshaft. One of the grooves in the pulley 58 is in radial alignment with the pulley 52 while the other groove in the pulley 58 is in radial alignment with the pulley 50. At the right of the pulleys 50 and 58 I have provided a power steering pump pulley 59 which is in radial alignment with the second speed driving pulley 50. At the left of the pulleys 50 and 58 I have provided a generator pulley 60 which is in radial alignment with the first speed driving pulley 22. A V-belt 61 extends around the first speed driving pulley 22, the generator pulley 60 and the rear groove of the fan pulley 58. The tension on this belt is adjusted by radial adjustment of the generator pulley 60. A second V-belt 62 extends around the second speed driving pulley 50 over the forward groove in the fan pulley 58 and around the power steering pump pulley 59. This belt is adjusted by radial adjustment of the pump pulley 59.

From the foregoing it will be seen that when the engine is stationary and at all operating speeds up to about 1600 r.p.m., a drive is conveyed from the crankshaft through the clutch band 25 to drive the first speed driving pulley 22 at crankshaft speed. At such time the pulley 22 drives the fan and water pump pulley 58 and generator through the belt 61. The fan and water pump pulley in turn drives the power steering pump 59 and also causes the second speed drive pulley 50 to overrun the crankshaft. The pulley 50 now simply serves as an idling pulley. In the arrangement shown the fan and water pump pulley are of substantially the same diameter as the pulley 22 so that the fan and water pump rotate at substantially crankshaft speed. The generator pulley and power steering pump are rotated at a faster speed but still at a fixed ratio with the crankshaft.

As the speed of the engine is increased above 1600 r.p.m., the centrifugal weight 46 moves outwardly to actuate the valve 36 and thus causes disengagement of the clutch band 25 from the first speed driving pulley. Immediately all of the pulleys start to slow down and continue to decelerate until the speed of the second speed driving pulley 50 equals the crankshaft speed. At this time the roller clutch engages so that the drive from the crankshaft is conducted through the roller clutch to the second speed driving pulley 50. This is accomplished without jerk because engagement occurs when the speeds are the same and no inertia forces are involved. At this time the drive from the crankshaft is conveyed through the overrunning clutch directly to the second speed pulley 50 which in turn drives the fan and water pump pulley and power steering pump pulley. Inasmuch as the second speed driving pulley is substantially smaller than the fan and water pump pulley the fan, water pump and power steering pump are driven at a reduced speed ratio. The generator is driven by belt 61 from the fan and water pump pulley and at this time the pulley 22 is simply an idling pulley which rotates in the same direction as the crankshaft but at a reduced speed. This second speed drive continues until the r.p.m. of the engine is reduced to the point where the centrifugal weight 46 again returns to its inner position. It is desirable that the speed at which the first speed ratio again engages should be around 1400 r.p.m. of the engine or at the most only a few hundred r.p.m. below that at which the second speed ratio engages. This is difficult to accomplish with an ordinary governor where the governor must be relied upon to do any appreciable work. Due to the fact that the governor spring 47 is tensioned by the force generated by the piston 33, the spring 47 will return the weight 46 at a speed only a little below that which will cause the weight to move outwardly.

I have shown in Figure 8 a tabulation of the horsepower required to drive common accessories in connection with an automobile engine. This chart shows that at 40 miles per hour car speed about 3.3 horsepower are required for all the standard accessories. If the car speed is increased to 80 miles per hour these accessories require a total of about 12 horsepower. With my two speed accessory drive the power requirements for the same accessories at 80 miles per hour are reduced to about 5.7 horsepower. This is a gain of about 6 horsepower and is accomplished by the use of this drive at such speeds. At higher car speeds the gain is, of course, proportionally greater because the power required to drive the water pump and fan increases as the cube of speed.

It will be understood that the invention is not to be limited to the exact construction shown and described, and that various changes and modifications may be made without departing from the spirit and scope of the invention, as defined in the appended claims.

What is claimed is:

1. In a two speed engine accessory drive, a first speed driving member rotatably mounted in axial alignment with a driven shaft of said engine, a second speed driving member rotatably mounted in axial alignment with a driven shaft of said engine, a friction clutch arranged to operatively couple said first speed driving member with its associated driving shaft, an overrunning clutch coupling said second speed driving member with its associated driving shaft, a plurality of rotatable accessories connected to each of said driving members so as to be driven by either of said members, fluid actuated means for controlling the engagement of said friction clutch, means for conducting fluid under pressure to said actuating means, and a centrifugally actuated valve interposed in said conducting means and driven in synchronism with said engine, said valve limiting the engagement of said friction clutch to relatively low engine speeds.

2. In a two speed engine accessory drive, a first speed driving pulley rotatably mounted in axial alignment with a driven shaft of said engine, a second speed driving pulley rotatably mounted in axial alignment with a driven shaft from said engine, a friction clutch arranged to operatively couple said first speed driving pulley with its associated driving shaft, an overrunning clutch coupling said second speed driving pulley with its associated driving shaft, a plurality of rotatable accessories connected by belts with both of said driving pulleys so as to be driven by either of said pulleys, fluid actuated means for controlling the engagement of said friction clutch, means for conducting fluid under pressure to said actuating means, and a centrifugally actuated valve interposed in said conducting means and driven in synchronism with said engine, said valve limiting the engagement of said friction clutch to relatively low engine speeds.

3. In a two speed engine accessory drive, a first speed driving pulley rotatably mounted in axial alignment with the crankshaft of said engine, a second speed driving pulley of smaller diameter than said first speed driving pulley rotatably mounted in axial alignment with the crankshaft of said engine, a friction clutch arranged to operatively couple said first speed driving pulley with said crankshaft, an overrunning clutch coupling said second speed driving pulley with said crankshaft, a plurality of accessories connected by belts with both of said driving pulleys so as to be driven by either of said pulleys, fluid actuated means for controlling the engagement of said friction clutch, means for conducting fluid under pressure to said actuating means, and a centrifugally actuated valve interposed in said conducting means and driven in synchronism with said engine, said valve limiting the engagement of said friction clutch to relatively low engine speeds.

4. In a two speed engine accessory drive, a first speed driving pulley rotatably mounted in axial alignment with a driven shaft of said engine, a second speed driving pulley rotatably mounted in axial alignment with a driven shaft of said engine, a friction clutch arranged to operatively couple said first speed driving pulley with its associated driving shaft, an overrunning clutch coupling said second speed driving pulley with its associated driving shaft, a plurality of rotatable accessories connected by belts with both of said driving pulleys, so as to be driven by either of said pulleys, means for urging said friction clutch into engagement, fluid actuating means for effecting the disengagement of said friction clutch, means for conducting fluid under pressure to said fluid actuating means, and a centrifugally actuated valve interposed in said conducting means and driven in synchronism with said engine, said valve limiting the engagement of said friction clutch to relatively low engine speeds.

5. In a two speed engine accessory drive, a first speed driving member rotatably mounted in axial alignment with a driven shaft of said engine, a second speed driving member rotatably mounted in axial alignment with a driven shaft of said engine, a friction clutch arranged to operatively couple said first speed driving member with its associated driving shaft, an overrunning clutch coupling said second speed driving member with its associated driving shaft, a plurality of rotatable accessories conected to each of said driving members so as to be driven by either of said members, spring means which urge said friction clutch into engagement, fluid actuating means for effecting the disengagement of said friction clutch, means for conducting fluid under pressure to said fluid actuating means, and a centrifugally actuated valve interposed in said conducting means and driven in synchronism with said engine, said valve limiting the engagement of said friction clutch to relatively low engine speeds.

6. In a two speed engine accessory drive, a first speed driving pulley rotatably mounted in axial alignment with the crankshaft of said engine, a second speed driving pulley smaller in diameter than said first speed driving pulley mounted in axial alignment with said crankshaft, means for selectively coupling said pulleys to said crankshaft, a double pulley rotatably mounted in position radially spaced from said crankshaft, an accessory driving pulley rotatably mounted in position radially spaced from said pulleys, a second accessory driving pulley rotatably mounted in position radially spaced from said pulleys, a belt extending around said first speed driving pulley and said double pulley and one of said accessory driving pulleys, and a second belt extending around said second speed driving pulley and said double pulley and the other of said accessory driving pulleys.

7. In a two speed engine accessory drive, a first speed driving V-belt pulley rotatably mounted in axial alignment with the crankshaft of said engine, a second speed driving V-belt pulley smaller in diameter than said first speed driving pulley mounted in axial alignment with said crankshaft, means for selectively coupling said pulleys to said crankshaft, a double grooved pulley rotatably mounted in position radially spaced from said crankshaft having one of its grooves in the plane of said first speed driving pulley and the other of its grooves in the plane of said second speed driving pulley, an accessory driving pulley rotatably mounted in the plane of said first speed driving pulley and radially spaced therefrom, a second accessory driving pulley rotatably mounted in the plane of said second speed driving pulley and radially spaced therefrom, a belt extending around said first speed driving pulley and one of the grooves in said double grooved pulley and one of said accessory driving pulleys, and a second belt extending around said second speed driving pulley and the other of the grooves in said double grooved pulley and the other of said accessory driving pulleys.

8. In a two speed engine accessory drive, a first speed driving pulley rotatably mounted in axial alignment with the engine crankshaft of said engine, a second speed driving pulley smaller in diameter than said first speed driving pulley mounted in axial alignment with said crankshaft, means for selectively coupling said pulleys to said crankshaft, a double grooved pulley rotatably mounted in position axially spaced from said crankshaft, having one of its grooves in the plane of said first speed driving pulley and the other of said grooves in the plane of said second speed driving pulley, a generator driving pulley rotatably mounted in the plane of said first speed driving pulley, a second accessory driving pulley rotatably mounted in the plane of said second speed driving pulley, a belt extending around said first speed driving pulley and one of the grooves in said double groove pulley and said generator pulley, and a second belt extending around said second speed driving pulley and the other of said grooves in said double groove pulley and said accessory drive pulley.

9. In a two speed engine accessory drive, a first speed driving pulley rotatably mounted in axial alignment with the crankshaft of said engine, a second speed driving pulley smaller in diameter than said first speed driving pulley mounted in axial alignment with said crankshaft, a friction clutch operatively connecting said first speed pulley to said crankshaft, means for engaging said clutch at low engine speeds, an overrunning clutch connecting said second speed pulley to said crankshaft so that it may overrun said shaft in its normal direction of rotation, a double grooved pulley rotatably mounted in position radially spaced from said crankshaft, having one of its grooves in alignment with said first speed driving pulley and the other of its grooves being in alignment with said second speed driving pulley, an accessory driving pulley, a second accessory driving pulley, a belt extending around said first speed driving pulley and said double grooved pulley and one of said accessory driving pulleys, and a second belt extending around said second speed driving pulley and said double grooved pulley and the other of said accessory driving pulleys.

10. In a two speed engine accessory drive, a first speed driving pulley rotatably mounted in axial alignment with the crankshaft of said engine, a second speed driving pulley rotatably mounted in axial alignment with said crankshaft, a friction clutch arranged to couple said first speed driving pulley to said crankshaft, an overrunning clutch coupling said second speed driving pulley to said crankshaft, fluid actuated means for controlling the engagement of said friction clutch, means for conducting fluid under pressure to said actuating means, a centrifugally actuated valve interposed in said conducting means, said valve being driven by said crankshaft, and said valve controlling the engagement of said friction clutch to relatively low engine speeds, a double grooved pulley rotatably mounted in position radially spaced from said crankshaft, an accessory driving pulley rotatably mounted in alignment with one of the grooves in said double grooved pulley, a second accessory driving pulley rotatably mounted in alignment with the other groove in said double grooved pulley, a belt extending around said first speed driving pulley and said double grooved pulley and one of said accessory driving pulleys, and a second belt extending around said second speed driving pulley and said double grooved pulley and the other of said accessory driving pulleys.

11. In a two speed engine accessory drive, a first speed driving pulley rotatably mounted in axial alignment with the crankshaft of said engine, a second speed driving pulley of smaller diameter than said first speed pulley rotatably mounted in axial alignment with said crankshaft, a friction clutch rotatably driven by said crankshaft and positioned when engaged to couple said first speed pulley to said crankshaft, an overrunning clutch interposed between said second speed driving pulley and said crankshaft which permits said second speed pulley to overrun said crankshaft and which prevents said second speed pulley from going slower than said crankshaft, a spring resiliently urging said friction clutch into engagement at all times, a fluid actuated piston which when actuated overrides said spring to disengage said friction clutch, means for conducting fluid under pressure to said piston, centrifugally operated valve driven by said crankshaft and interposed in said fluid conducting means which permits said fluid to flow to said piston only at high engine speeds, a double grooved pulley, a plurality of accessory drive pulleys, a belt extending around said first speed driving pulley and said double groove pulley and one of said accessory drive pulleys, and a second belt extending around said second speed pulley and said double groove pulley and the other of said accessory drive pulleys.

12. In a two speed engine accessory drive, a first speed driving pulley rotatably mounted in axial alignment with a driven shaft of said engine, a second speed driving pulley smaller in diameter than said first speed driving pulley mounted in axial alignment with said driven shaft, means for selectively coupling said pulleys to said driven shaft, said means comprising a first clutch for coupling one of said pulleys to said driven shaft and a second clutch for coupling the other of said pulleys to said driven shaft, a double pulley rotatably mounted in position radially spaced from said driven shaft, an accessory driving pulley rotatably mounted in position radially spaced from said pulleys, a second accessory driving pulley rotatably mounted in position radially spaced from said pulleys, a belt extending around said first speed driving pulley and said double pulley and one of said accessory driving pulleys, and a second belt extending around said second speed driving pulley and said double pulley and the other of said accessory driving pulleys.

13. In a two speed engine accessory drive, a first speed driving pulley rotatably mounted in axial alignment with a driven shaft of said engine, a second speed driving pulley smaller in diameter than said first speed driving pulley mounted in axial alignment with said driven shaft, means for selectively coupling said pulleys to said driven shaft, said means comprising a first clutch of the friction type for coupling one of said pulleys to said driven shaft and a second clutch for coupling the other of said pulleys to said driven shaft, a double pulley rotatably mounted in position radially spaced from said driven shaft, an accessory driving pulley rotatably mounted in position radially spaced from said pulleys, a second accessory driving pulley rotatably mounted in position radially spaced from said pulleys, a belt extending around said first speed driving pulley and said double pulley and one of said accessory driving pulleys, and a second belt extending around said second speed driving pulley and said double pulley and the other of said accessory driving pulleys.

14. In a two speed engine accessory drive, a first speed driving pulley rotatably mounted in axial alignment with a driven shaft of said engine, a second speed driving pulley smaller in diameter than said first speed driving pulley mounted in axial alignment with said driven shaft, first and second clutch means for selectively coupling said pulleys to said driven shaft, said first clutch means comprising a friction clutch arranged to operatively couple one of said speed driving pulleys with said driven shaft, said second clutch means arranged to operatively couple the other of said speed driving pulleys with said driven shaft, fluid actuated means for controlling the engagement of said friction clutch, means for conducting fluid under pressure to said fluid actuated means, and a centrifugally actuated valve interposed in said conducting means and driven in synchronism with said engine, said valve limiting the engagement of said friction clutch to relatively low engine speeds, a double pulley rotatably mounted in position radially spaced from said driven shaft, an accessory driving pulley rotatably mounted in position radially spaced from said pulleys, a second accessory driving pulley rotatably mounted in position radially spaced from said pulleys, a belt extending around said first speed driving pulley and said double pulley and one of said accessory driving pulleys, and a second belt extending around said second speed driving pulley and said double pulley and the other of said accessory driving pulleys.

15. In a two speed engine accessory drive, a first speed driving pulley rotatably mounted in axial alignment with a driven shaft of said engine, a second speed driving pulley smaller in diameter than said first speed driving pulley mounted in axial alignment with said driven shaft, first and second clutch means for selectively coupling said pulleys to said driven shaft, said first clutch means comprising a friction clutch arranged to operatively couple said first speed driving pulley with said driven shaft, said second clutch means arranged to operatively couple said second speed driving pulley with said driven shaft, spring means which urge said friction clutch into engagement, fluid actuating means for effecting the disengagement of said friction clutch, means for conducting fluid under pressure to said fluid actuating means, a centrifugally actuated valve interposed in said conducting means and driven in synchronism with said engine, said valve limiting the engagement of said friction clutch to relatively low engine speeds, a double pulley rotatably mounted in position radially spaced from said driven shaft, an accessory driving pulley rotatably mounted in position radially spaced from said pulleys, a second accessory driving pulley rotatably mounted in position radially spaced from said pulleys, a belt extending around said first speed driving pulley and said double pulley and one of said accessory driving pulleys, and a second belt extending around said second speed driving pulley and said double pulley and the other of said accessory driving pulleys.

16. An accessory drive for an engine comprising, a driving member fixed to a shaft driven by said engine, a pulley rotatably mounted relative to said shaft and in axial alignment therewith, clutch means for operatively and frictionally clutching said pulley to said driving member, a plurality of accessories driven by said pulley, a fluid actuated piston associated with said clutching means, the movement of which in one direction disengages said clutching means, a source of fluid under pressure, a conduit extending from said fluid source to said piston and then to an exhaust passageway, and a centrifugally actuated valve rotated by said engine interposed in said conduit which in one position connects said piston with said exhaust passageway and which in another position causes said fluid to exert pressure in back of said piston to thereby control the engagement and release of said clutch means according to the speed of rotation of said engine.

17. An accessory drive for an engine comprising, a driving member fixed to a shaft driven by said engine, a pulley rotatably mounted relative to said shaft and in axial alignment therewith, clutch means for operatively and frictionally clutching said pulley to said driving member, a fluid actuated piston associated with said clutching means, the movement of which in one direction disengages said clutching means, an oil conduit extending axially through said shaft and then to said piston and then to an exhaust passageway, said conduit conducting engine lubricating oil under pressure from said engine to said piston, and a valve actuated by centrifugal force, said valve being rotated by said engine and being interposed in said conduit, which valve in one of its positions connects said piston with said exhaust passageway and which in another of its positions maintains oil under pressure in back of said piston to thereby control the engagement and release of said clutching means according to the speed at which said engine is operating.

18. An accessory drive for an engine comprising, a driving member fixed to the crankshaft of said engine, a pulley rotatably mounted relative to said crankshaft and in axial alignment therewith, clutch means for operatively and frictionally clutching said pulley to said driving member, a hydraulically actuated piston associated with said clutching means, the movement of which in one direction causes disengagement of said clutch means, an oil conduit extending axially through said crankshaft and then to said piston and then back to an oil sump in said engine, which conduit conducts lubricating oil under pressure from said engine to said piston, and a valve actuated by centrifugal force, said valve being rotated by said crankshaft and interposed in said conduit, which valve in one of its positions connects said piston with said oil sump and which in another of its positions maintains oil under pressure in back of said piston to thereby control the engagement and release of said clutch means according to the speed at which said engine is being operated.

19. An accessory drive for an engine comprising, a sleeve secured to the crankshaft of said engine so as to be rotated therewith, a pulley rotatably mounted upon said sleeve, a driving member fixed to said sleeve, a friction clutch arranged to operatively couple said pulley to said driving member, a hydraulically actuated piston associated with said clutching means, the movement of which in one direction causes disengagement of said clutching means, an oil conduit extending axially through said crankshaft to said piston and then back to an oil sump in said engine, which conduit conducts lubricating oil under pressure from said engine to said piston, and a valve actuated by centrifugal force, said valve being rotated by said crankshaft and interposed in said conduit and which valve in one of its positions connects said piston with said oil sump and which in another of its positions maintains oil under pressure in back of said piston to thereby control the engagement and release of said clutching means according to the speed at which said engine is being rotated.

20. In a two speed engine accessory drive, a first speed driving pulley rotatably mounted in axial alignment with the crankshaft of said engine, a second speed driving pulley rotatably mounted in axial alignment with said crankshaft, means for selectively coupling said first and second speed driving pulleys to said crankshaft, a double pulley rotatably mounted in position radially spaced from said crankshaft, an accessory driving pulley rotatably mounted radially spaced from said double pulley, a second accessory driving pulley rotatably mounted in position radially spaced from said double pulleys and said accessory driving pulley, a belt extending around said first speed driving pulley and said double pulley and one of said accessory driving pulleys, and a second belt extending around said second speed driving pulley and said double pulley and the other of said accessory driving pulleys, respective diameters of said first speed driving pulley and said second speed driving pulley and said double pulley being such that said double pulley will be driven at one speed ratio relative to said crankshaft when it is driven by said first speed driving pulley and at a different speed ratio relative to said crankshaft when it is driven by said second speed driving pulley.

21. In a two speed engine accessory drive, a first speed driving V-belt pulley rotatably mounted in axial alignment with the crankshaft of said engine, a second speed driving V-belt pulley mounted in axial alignment with said crankshaft, means for selectively coupling said pulleys to said crankshaft, a double grooved pulley rotatably mounted in position radially spaced from said crankshaft having one of its grooves in the plane of said first speed driving pulley and the other of its grooves in the plane of said second speed driving pulley, an accessory driving pulley rotatably mounted in the plane of said first speed driving pulley and radially spaced therefrom, a secondary accessory driving pulley rotatably mounted in the plane of said second speed driving pulley and radially spaced therefrom, a V-belt extending around said first speed driving pulley and one of the grooves in said double grooved pulley and one of said accessory driving pulleys, and a second V-belt extending around said second speed driving pulley and the other of the grooves in said double grooved pulley and the other of said accessory driving pulleys, the respective diameters of said first speed driving pulley and said second speed driving pulley and said double pulley being such that said double pulley will be driven at one speed ratio relative to said crankshaft when it is driven by said first speed driving pulley and at a different speed ratio relative to said crankshaft when it is driven by said second speed driving pulley.

22. In a two speed engine accessory drive, a first speed driving member rotatably mounted in axial alignment with a driven shaft of said engine, a second speed driving member rotatably mounted in axial alignment with said driven shaft, means for selectively coupling said driving members to said driven shaft, a double driving member rotatably mounted in position radially spaced from said driven shaft, an accessory driving member rotatably mounted in position radially spaced from said double driving member and said driven shaft, a second accessory driving member rotatably mounted in position radially spaced from said double driving member and said accessory driving member, and said driven shaft, a belt extending around said first speed driving member and said double driving member and one of said accessory driving members, and a second belt extending around said second speed driving member and said double driving member and the other of said accessory driving members, the respective diameters of said first speed driving member and said second speed driving member and said double driving member being such that said double driving member will be driven at one speed ratio relative to said driven shaft when it is driven by said first speed driving member and at a different ratio to said driven shaft when it is driven by said second speed driving member.

23. In a two speed engine accessory drive, a first speed driving pulley mounted in axial alignment with a driven shaft of said engine, a second speed driving pulley rotatably mounted in axial alignment with said driven shaft, means for selectively coupling said pulleys to said driven shaft, said means comprising a friction clutch for coupling one of said driving pulleys to said driven shaft and an overrunning clutch for coupling the other of said driving pulleys to said driven shaft, a double pulley rotatably mounted in position radially spaced from said driven shaft, an accessory driving pulley rotatably mounted in position radially spaced from said pulleys, a second accessory driving pulley rotatably mounted in position radially spaced from said pulleys, a belt extending around said first speed driving pulley and said double pulley and one of said accessory driving pulleys, and a second belt extending around said second speed driving pulley and said double pulley and the other of said accessory driving pulleys, the respective diameters of said first speed driving pulley and said second speed driving pulley and said double pulley being such that said double pulley will be driven at one speed ratio relative to said driven shaft when it is driven by said first speed driving pulley and at a different speed ratio relative to said driven shaft when it is driven by said second speed driving pulley.

24. In a two speed engine accessory drive, a first speed driving pulley rotatably mounted in axial alignment with a driven shaft of said engine, a second speed driving pulley rotatably mounted in axial alignment with said driven shaft, first and second clutch means for selectively coupling said pulleys to said driven shaft, said first clutch means comprising a friction clutch arranged to operatively couple one of said driving pulleys with said driven shaft, fluid actuated means for controlling the engagement of said friction clutch, means for conducting fluid under pressure to said fluid actuated means, a centrifugally actuated valve interposed in said conducting means and driven in synchronism with said engine, said valve limiting the engagement of said friction clutch to relatively low engine speeds, a double pulley rotatably mounted in position radially spaced from said driven shaft, an accessory driving pulley rotatably mounted in position radially spaced from said pulleys, a second accessory driving pulley rotatably mounted in position radially spaced from said pulleys, a belt extending around said first speed driving pulley and said double pulley and one of said accessory driving pulleys, and a second belt extending around said second speed driving pulley and said double pulley and the other of said accessory driving pulleys, the respective diameters of said first speed driving pulley and said second speed driving pulley and said double pulley being such that said double pulley will be driven at one speed ratio relative to said driven shaft when it is driven by said first speed driving pulley and at a different speed ratio relative to said driven shaft when it is driven by said second speed driving pulley.

25. In a two speed engine accessory drive, a first speed driving member rotatably mounted in axial alignment with a driven shaft of said engine, a second speed driving member rotatably mounted in axial alignment with said driven shaft, a double driving member rotatably mounted in a position radially spaced from said driven shaft, an accessory driving member rotatably mounted in a position radially spaced from said double driving member, a second accessory driving member rotatably mounted in a position spaced from said double driving member and said accessory driving member and said driven shaft, a first belt and a second belt, each of said belts passing around both the said double driving member and one of the first and second speed driving members, the first of said belts also passing around said accessory driving member, the second of said belts also passing around the second accessory driving member, clutch means connecting said driven shaft of said engine with said first speed driving means, means for engaging and disengaging said clutch, an overrunning clutch means interposed between a driving member and its associated shaft, the respective diameters of said first speed driving member and said second speed driving member and said double driving member being such that at least one part of said double driving member will be driven at one speed ratio relative to said driven shaft when it is driven by said first speed driving member and at a different ratio to said driven shaft when it is driven by said second speed driving member.

No references cited.